(12) United States Patent
Amini et al.

(10) Patent No.: US 12,695,884 B2
(45) Date of Patent: **\*Jul. 28, 2026**

(54) MULTI-SENSOR MOTION DETECTION

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 18/806,518

(22) Filed: Aug. 15, 2024

(65) Prior Publication Data

US 2024/0406415 A1 Dec. 5, 2024

Related U.S. Application Data

(63) Continuation-in-part of application No. 18/149,446, filed on Jan. 3, 2023, now Pat. No. 12,088,826, which
(Continued)

(51) Int. Cl.
H04N 19/166 (2014.01)
G06F 9/54 (2006.01)
(Continued)

(52) U.S. Cl.
CPC ............ H04N 19/166 (2014.11); G06F 9/542 (2013.01); G06T 7/20 (2013.01); G06V 20/52 (2022.01);
(Continued)

(58) Field of Classification Search
CPC ........ H04N 19/166; H04N 7/12; H04N 7/183; H04N 17/002; H04N 19/103;
(Continued)

(56) References Cited

U.S. PATENT DOCUMENTS 7,539,489 B1 5/2009 Alexander
8,855,035 B2 10/2014 Lemoine et al.
(Continued)

FOREIGN PATENT DOCUMENTS

CN 103493397 A 1/2014
CN 104066146 A 9/2014
(Continued)

OTHER PUBLICATIONS

"Amazon Kinesis Video Streams Developer Guide", Amazon Web Services, Inc., 2018, 136 pp.
(Continued)

*Primary Examiner* — An T Nguyen
(74) *Attorney, Agent, or Firm* — Perkins Coie LLP

(57) ABSTRACT

A first one or more sensors are used to sense a presence of motion of one or more objects in an area. A second one or more sensors are used to sense an absence of motion in the area. One or more computer processors are used to generate information describing the presence of motion sensed using the first one or more sensors and the absence of motion sensed using the second one or more sensors. An artificial intelligence module is used to generate an adjustment to one or more motion detection thresholds of at least one of the first one or more sensors or the second one or more sensors based on the information. The at least one of the first one or more sensors or the second one or more sensors are caused to be configured using the adjustment to the motion detection thresholds.

20 Claims, 8 Drawing Sheets

Related U.S. Application Data is a continuation of application No. 17/379,513, filed on Jul. 19, 2021, now Pat. No. 11,575,912, which is a continuation of application No. 16/000,743, filed on Jun. 5, 2018, now Pat. No. 11,102,492.

(60) Provisional application No. 62/633,017, filed on Feb. 20, 2018.

(51) Int. Cl.

| | |
|---|---|
| *G06T 7/20* | (2017.01) |
| *G06V 20/52* | (2022.01) |
| *G07C 9/37* | (2020.01) |
| *G08B 3/10* | (2006.01) |
| *G08B 5/22* | (2006.01) |
| *G08B 13/191* | (2006.01) |
| *G08B 13/193* | (2006.01) |
| *G08B 13/196* | (2006.01) |
| *G08B 21/18* | (2006.01) |
| *G08B 27/00* | (2006.01) |
| *G08B 29/18* | (2006.01) |
| *H04B 17/318* | (2015.01) |
| *H04B 17/391* | (2015.01) |
| *H04L 1/00* | (2006.01) |
| *H04L 5/00* | (2006.01) |
| *H04L 43/0852* | (2022.01) |
| *H04L 43/12* | (2022.01) |
| *H04L 43/16* | (2022.01) |
| *H04L 65/612* | (2022.01) |
| *H04L 65/65* | (2022.01) |
| *H04L 65/80* | (2022.01) |
| *H04L 67/1087* | (2022.01) |
| *H04N 7/12* | (2006.01) |
| *H04N 7/18* | (2006.01) |
| *H04N 17/00* | (2006.01) |
| *H04N 19/103* | (2014.01) |
| *H04N 19/124* | (2014.01) |
| *H04N 19/156* | (2014.01) |
| *H04N 19/184* | (2014.01) |
| *H04N 19/40* | (2014.01) |
| *H04N 19/42* | (2014.01) |
| *H04N 23/11* | (2023.01) |
| *H04N 23/60* | (2023.01) |
| *H04N 23/661* | (2023.01) |
| *H04N 23/68* | (2023.01) |
| *H04N 23/90* | (2023.01) |
| *H04W 24/08* | (2009.01) |
| *H04W 24/10* | (2009.01) |
| *H04W 28/02* | (2009.01) |
| *H04W 52/02* | (2009.01) |
| *H04W 72/0453* | (2023.01) |
| *H04W 72/23* | (2023.01) |
| *H05B 47/105* | (2020.01) |
| *H05B 47/19* | (2020.01) |
| *H04N 7/14* | (2006.01) |
| *H04N 19/00* | (2014.01) |

(52) U.S. Cl.
CPC ................ *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/19656* (2013.01); *G08B 13/1966* (2013.01); *G08B 13/19669* (2013.01); *G08B 13/19695* (2013.01); *G08B 21/182* (2013.01); *G08B 27/006* (2013.01); *G08B 29/183* (2013.01);

*H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/11* (2023.01); *H04N 23/661* (2023.01); *H04N 23/665* (2023.01); *H04N 23/6811* (2023.01); *H04N 23/90* (2023.01); *H04W 24/08* (2013.01); *H04W 24/10* (2013.01); *H04W 28/021* (2013.01); *H04W 52/0245* (2013.01); *H04W 52/0261* (2013.01); *H04W 72/0453* (2013.01); *H04W 72/23* (2023.01); *H05B 47/105* (2020.01); *H05B 47/19* (2020.01); *G06T 2207/30232* (2013.01); *G06T 2207/30241* (2013.01); *H04N 7/147* (2013.01); *H04N 7/181* (2013.01); *H04N 19/00* (2013.01)

(58) Field of Classification Search
CPC .. H04N 19/124; H04N 19/156; H04N 19/184; H04N 19/40; H04N 19/42; H04N 23/11; H04N 23/661; H04N 23/665; H04N 23/6811; H04N 23/90; H04N 7/147; H04N 7/181; H04N 19/00; G06F 9/542; G06T 7/20; G06T 2207/30232; G06T 2207/30241; G06V 20/52; G07C 9/37; G08B 3/10; G08B 3/1016; G08B 5/223; G08B 13/191; G08B 13/193; G08B 13/19656; G08B 13/1966; G08B 13/19669; G08B 13/19695; G08B 21/182; G08B 27/006; G08B 29/183; G08B 13/16; G08B 13/19602; G08B 29/186; G08B 29/188; H04B 17/318; H04B 17/391; H04L 1/0003; H04L 1/0009; H04L 1/0017; H04L 1/0033; H04L 5/0053; H04L 43/0858; H04L 43/12; H04L 43/16; H04L 65/612; H04L 65/65; H04L 65/80; H04L 67/1093; H04W 24/08; H04W 24/10; H04W 28/021; H04W 52/0245; H04W 52/0261; H04W 72/0453; H04W 72/23; H05B 47/105; H05B 47/19

See application file for complete search history.

(56) References Cited

U.S. PATENT DOCUMENTS

| | | | |
|---|---|---|---|
| 9,179,495 B1 | 11/2015 | Scherzer et al. | |
| 9,451,484 B2 | 9/2016 | Boulton | |
| 9,712,814 B2 | 7/2017 | Tanaka et al. | |
| 9,906,722 B1 | 2/2018 | Gibot | |
| 9,996,750 B2 | 6/2018 | Campbell | |
| 10,033,436 B2 | 7/2018 | Thubert et al. | |
| 10,044,104 B1 | 8/2018 | Bartko et al. | |
| 10,177,965 B1 | 1/2019 | Joshi et al. | |
| 10,425,638 B2 | 9/2019 | Yu et al. | |
| 10,555,393 B1* | 2/2020 | Fu | F21S 8/03 |
| 10,643,412 B1 | 5/2020 | Yang | |
| 10,986,717 B1 | 4/2021 | Fu | |
| 11,232,688 B1 | 1/2022 | Lemberger | |

(56) References Cited

U.S. PATENT DOCUMENTS

| | | |
|---|---|---|
| 2002/0059627 A1 | 5/2002 | Islam et al. |
| 2002/0105921 A1 | 8/2002 | Sawyer et al. |
| 2002/0181637 A1 | 12/2002 | Nakabayashi |
| 2003/0055908 A1 | 3/2003 | Brown et al. |
| 2003/0063277 A1 | 4/2003 | Kennedy et al. |
| 2003/0193525 A1 | 10/2003 | Nygaard |
| 2005/0086569 A1 | 4/2005 | Hiddink et al. |
| 2005/0169209 A1 | 8/2005 | Miu et al. |
| 2006/0232673 A1 | 10/2006 | Lipton |
| 2007/0153916 A1 | 7/2007 | Demircin et al. |
| 2008/0020746 A1 | 1/2008 | Alexandar et al. |
| 2008/0025378 A1 | 1/2008 | Mahany et al. |
| 2008/0026748 A1 | 1/2008 | Alexander et al. |
| 2008/0112315 A1 | 5/2008 | Hu et al. |
| 2009/0022222 A1 | 1/2009 | He et al. |
| 2009/0273679 A1 | 11/2009 | Gere et al. |
| 2009/0290019 A1 | 11/2009 | Mcnelis et al. |
| 2010/0080205 A1 | 4/2010 | Hirsch et al. |
| 2010/0097472 A1 | 4/2010 | Chathukutty et al. |
| 2010/0109934 A1 | 5/2010 | Drake et al. |
| 2010/0285753 A1 | 11/2010 | Foegelle |
| 2012/0314875 A1 | 12/2012 | Lee et al. |
| 2013/0021912 A1 | 1/2013 | Finlow-bates et al. |
| 2013/0053653 A1 | 2/2013 | Cuddihy et al. |
| 2013/0089039 A1 | 4/2013 | Vashi et al. |
| 2013/0128947 A1 | 5/2013 | Fryer et al. |
| 2014/0036993 A1 | 2/2014 | Bae |
| 2014/0051379 A1 | 2/2014 | Ganesh et al. |
| 2014/0064120 A1 | 3/2014 | Sethuraman et al. |
| 2014/0092755 A1 | 4/2014 | Van De Ven et al. |
| 2014/0115114 A1 | 4/2014 | Garmark et al. |
| 2014/0169195 A1 | 6/2014 | Hsin et al. |
| 2014/0169509 A1 | 6/2014 | Tsofe |
| 2014/0240491 A1 | 8/2014 | Kauniskangas et al. |
| 2014/0269655 A1 | 9/2014 | Du et al. |
| 2014/0307707 A1 | 10/2014 | Mestanov et al. |
| 2014/0358592 A1 | 12/2014 | Wedig et al. |
| 2014/0368601 A1 | 12/2014 | DeCharms |
| 2015/0185857 A1 | 7/2015 | Jung |
| 2015/0229426 A1 | 8/2015 | Yu et al. |
| 2015/0312572 A1 | 10/2015 | Owen |
| 2015/0319411 A1 | 11/2015 | Kasmir et al. |
| 2015/0349859 A1 | 12/2015 | Emmanuel et al. |
| 2015/0381310 A1 | 12/2015 | Hammarwall et al. |
| 2016/0105644 A1 | 4/2016 | Smith et al. |
| 2016/0114887 A1 | 4/2016 | Zhou et al. |
| 2016/0125714 A1 | 5/2016 | Kates et al. |
| 2016/0165620 A1 | 6/2016 | Dagen et al. |
| 2016/0278104 A1 | 9/2016 | Hiremath et al. |
| 2016/0337243 A1 | 11/2016 | Cui et al. |
| 2016/0366702 A1 | 12/2016 | Baba et al. |
| 2017/0055179 A1 | 2/2017 | Radunovic et al. |
| 2017/0070732 A1 | 3/2017 | Roulet et al. |
| 2017/0078242 A1 | 3/2017 | Nakamura et al. |
| 2017/0123058 A1 | 5/2017 | Yavari |
| 2017/0162225 A1 | 6/2017 | Jeong |
| 2017/0163944 A1 | 6/2017 | Jeong |
| 2017/0180442 A1 | 6/2017 | Lawrence |
| 2017/0237673 A1 | 8/2017 | Law |
| 2017/0242129 A1 | 8/2017 | Kallankari et al. |
| 2017/0244712 A1 | 8/2017 | Meredith et al. |
| 2017/0301201 A1 | 10/2017 | Siann et al. |
| 2017/0301203 A1 | 10/2017 | Matsuura |
| 2018/0306904 A1 | 10/2018 | Vacanti |
| 2018/0308328 A1 | 10/2018 | Siminoff |
| 2018/0357870 A1 | 12/2018 | Siminoff |
| 2018/0375594 A1 | 12/2018 | Kildal et al. |
| 2019/0014388 A1 | 1/2019 | Rutledge et al. |
| 2019/0020827 A1 | 1/2019 | Siminoff |
| 2019/0132371 A1 | 5/2019 | Bhat et al. |
| 2019/0162769 A1 | 5/2019 | Zhao et al. |
| 2019/0174330 A1 | 6/2019 | Wen |
| 2019/0200013 A1 | 6/2019 | Wu et al. |
| 2019/0202657 A1 | 7/2019 | Li et al. |
| 2019/0222897 A1 | 7/2019 | Frusina et al. |
| 2019/0261370 A1 | 8/2019 | Amini et al. |
| 2019/0282897 A1 | 9/2019 | Posin |
| 2019/0364505 A1 | 11/2019 | Wang et al. |

FOREIGN PATENT DOCUMENTS

| | | |
|---|---|---|
| CN | 105246131 A | 1/2016 |
| CN | 106534634 A | 3/2017 |
| CN | 106954026 A | 7/2017 |
| CN | 110177393 A | 8/2019 |
| CN | 110177835 A | 8/2019 |
| JP | 2010232819 A | 10/2010 |
| WO | 2006075052 A1 | 7/2006 |
| WO | 2007047419 A2 | 4/2007 |
| WO | 2009048660 A2 | 4/2009 |
| WO | 2014144628 A2 | 9/2014 |

OTHER PUBLICATIONS

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

* cited by examiner

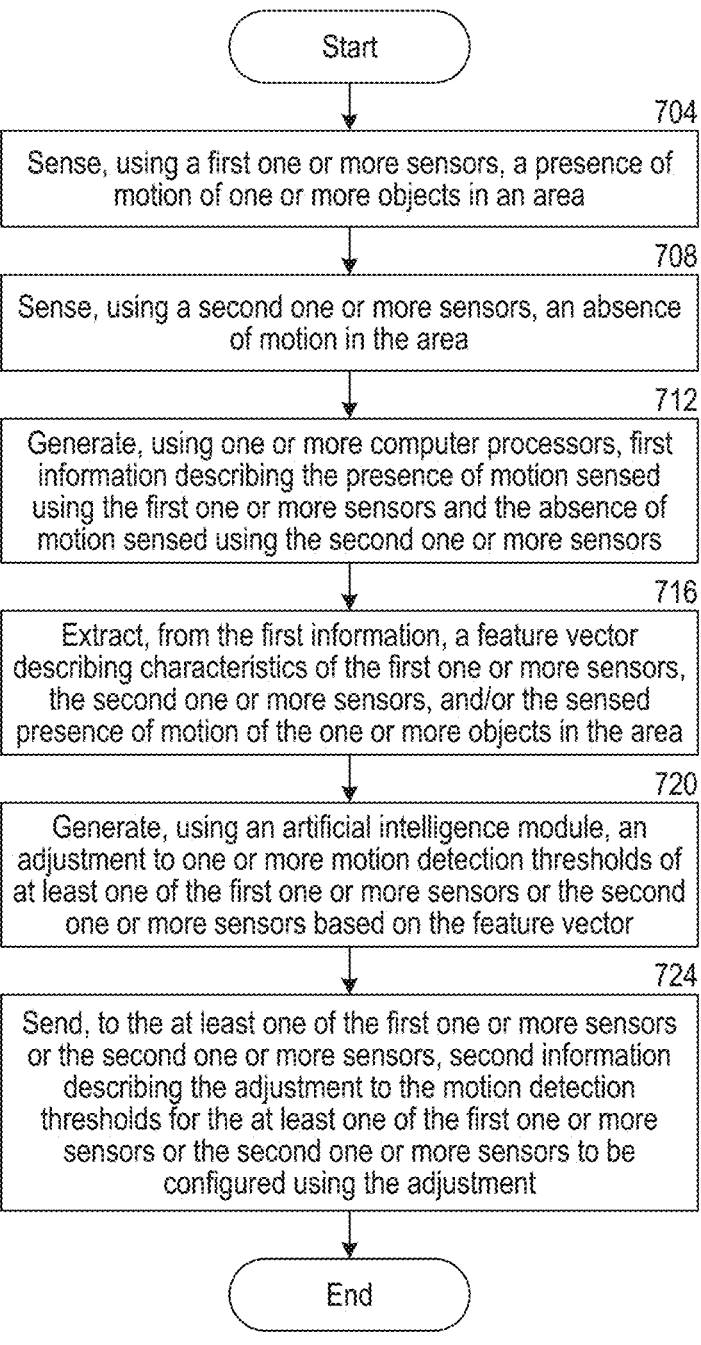

Start

704

Sense, using a first one or more sensors, a presence of motion of one or more objects in an area

708

Sense, using a second one or more sensors, an absence of motion in the area

712

Generate, using one or more computer processors, first information describing the presence of motion sensed using the first one or more sensors and the absence of motion sensed using the second one or more sensors

716

Extract, from the first information, a feature vector describing characteristics of the first one or more sensors, the second one or more sensors, and/or the sensed presence of motion of the one or more objects in the area

720

Generate, using an artificial intelligence module, an adjustment to one or more motion detection thresholds of at least one of the first one or more sensors or the second one or more sensors based on the feature vector

724

Send, to the at least one of the first one or more sensors or the second one or more sensors, second information describing the adjustment to the motion detection thresholds for the at least one of the first one or more sensors or the second one or more sensors to be configured using the adjustment End

Figure 7

MULTI-SENSOR MOTION DETECTION

CROSS-REFERENCE TO RELATED APPLICATION(S)

This application is a continuation-in-part of U.S. patent application Ser. No. 18,149,446, entitled "Multi-Sensor Motion Detection," and filed on Jan. 3, 2023, which is a continuation of U.S. patent application Ser. No. 17/379,513, entitled "Multi-Sensor Motion Detection," and filed on Jul. 19, 2021 (now U.S. Pat. No. 11,575,912), which is a continuation of U.S. patent application Ser. No. 16/000,743, entitled "Multi-Sensor Motion Detection," and filed on Jun. 5, 2018 (now U.S. Pat. No. 11,102,492), which claims priority to U.S. Provisional Patent Application No. 62/633,017, entitled "Optimization and Testing of Wireless Devices," and filed on Feb. 20, 2018, all of which are incorporated herein by reference in their entireties.

TECHNICAL FIELD

The disclosure relates to motion detection and, in particular, motion detection using different types of sensors.

BACKGROUND

Cameras for home or business security uses can include an infrared (IR) sensor and an image sensor such as a complementary metal-oxide-semiconductor (CMOS) image sensor (or charge-coupled device (CCD) image sensor). The IR sensor can be used to detect motion in an infrared portion of the electromagnetic spectrum, for example, wavelengths of 700 nanometers (nm) to 1 millimeter (mm). If motion is detected using the IR sensor, then the IR sensor can provide a signal to a microcontroller which, upon receiving the signal, can turn on the image sensor and other components of the camera such that video in the visible light portion of the electromagnetic spectrum, for example, wavelengths of 400 nm to 700 nm, can be recorded using the CMOS image sensor.

Many cameras are often battery-powered to provide easy installation for users. However, if the IR sensor provides a false positive motion detection, the other components of the camera can be turned on to begin the video recording process. The resulting video would show nothing of interest to the user and, therefore, the camera unnecessarily drained some of its battery. Moreover, the user might be notified of the detected motion, for example, via a message delivered to a smartphone. The user might then want to watch the video and find that there is nothing of interest due to the false positive. Thus, the user experience can be degraded.

SUMMARY

Some of the subject matter described herein includes a method including: determining, by a processor, a first indication of a motion of a first object in an area based on a first sensor that is responsive to wavelengths in a first, non-visible light region of an electromagnetic spectrum; receiving first video data depicting the motion of the first object in the area as recorded by an image sensor that is responsive to wavelengths in a visible light portion of the electromagnetic spectrum; determining, by the processor, a second indication of the motion of the first object in the area based on a second sensor that is responsive to wavelengths in a second, non-visible light region of the electromagnetic spectrum; determining, by the processor, with both of the first indication of the motion and the second indication of the motion that the motion of the object is not a false positive determination of motion in the area; and providing the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the method includes adjusting motion detection thresholds used by the camera to determine motion of objects in the area, the motion detection thresholds being related to characteristics of the motion that are considered in a determination that motion is occurring in the area.

In some implementations, the method includes: determining, by the processor, a second indication of motion of a second object in the area based on the first sensor; receiving second video data depicting the motion of the second object in the area; determining, by the processor, that the second sensor did not provide an indication of the second object in the area; determining, by the processor, that the second indication of the motion of the second object is a false positive determination of motion based on the second sensor not providing the indication of the motion of the second object in the area; and refraining from providing the second video data to the cloud server based on the determination of the motion of the second object being a false positive determination of motion.

In some implementations, the first sensor is an infrared (IR) sensor, and the method further includes adjusting motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

In some implementations, the second sensor is a radar sensor.

Some of the subject matter described herein also includes an electronic device, including: one or more processors and memory storing instructions, wherein the processor is configured to execute the instructions such that the processor and memory are configured to: determine a first indication of a motion of a first object in an area based on a first sensor that is responsive to wavelengths in a first, non-visible light region of an electromagnetic spectrum; receive first video data depicting the motion of the first object in the area as recorded by an image sensor that is responsive to wavelengths in a visible light portion of the electromagnetic spectrum; determine a second indication of the motion of the first object in the area based on a second sensor that is responsive to wavelengths in a second, non-visible light region of the electromagnetic spectrum; determine with both of the first indication of the motion and the second indication of the motion that the motion of the object is not a false positive determination of motion in the area; and provide the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the processor is configured to execute the instructions such that the processor and memory are configured to adjust motion detection thresholds used by the camera to determine motion of objects in the area, the motion detection thresholds being related to characteristics of the motion that are considered in a determination that motion is occurring in the area.

In some implementations, the processor is configured to execute the instructions such that the processor and memory are configured to: determine a second indication of motion of a second object in the area based on the first sensor; receive second video data depicting the motion of the second object in the area; determine that the second sensor did not provide an indication of the second object in the area; determine that the second indication of the motion of the second object is a false positive determination of motion based on the second sensor not providing the indication of the motion of the second object in the area; and refrain from providing the second video data to the cloud server based on the determination of the motion of the second object being a false positive determination of motion.

In some implementations, the first sensor is an infrared (IR) sensor, and the processor is configured to execute the instructions such that the processor and memory are configured to adjust motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

In some implementations, the second sensor is a radar sensor.

Some of the subject matter described herein also includes a computer program product including one or more non-transitory, computer-readable media storing computer program instructions, execution of which by a processing system causes the processing system to perform operations including: determining a first indication of a motion of a first object in an area based on a first sensor that is responsive to wavelengths in infrared first, non-visible light region of an electromagnetic spectrum; receiving first video data depicting the motion of the first object in the area as recorded by an image sensor that is responsive to wavelengths in a visible light portion of the electromagnetic spectrum; determining a second indication of the motion of the first object in the area based on a second sensor that is responsive to wavelengths in a second, non-visible light region of the electromagnetic spectrum; determining with both of the first indication of the motion and the second indication of the motion that the motion of the object is not a false positive determination of motion in the area; and providing the first video data to a cloud server for viewing the motion of the first object in the area based on the determination that the motion is not a false positive.

In some implementations, the first sensor is an infrared (IR) sensor, and the IR sensor and the image sensor are part of a camera having a field of view including the area.

In some implementations, the execution of the computer program instructions causes the processing system to perform operations comprising adjust motion detection thresholds used by the camera to determine motion of objects in the area, the motion detection thresholds being related to characteristics of the motion that are considered in a determination that motion is occurring in the area.

In some implementations, the execution of the computer program instructions causes the processing system to perform operations including: determining a second indication of motion of a second object in the area based on the first sensor; receiving second video data depicting the motion of the second object in the area; determining that the second sensor did not provide an indication of the second object in the area; determining that the second indication of the motion of the second object is a false positive determination of motion based on the second sensor not providing the indication of the motion of the second object in the area; and refraining from providing the second video data to the cloud server based on the determination of the motion of the second object being a false positive determination of motion.

In some implementations, the first sensor is an infrared (IR) sensor, wherein the execution of the computer program instructions causes the processing system to perform operations including adjust motion detection thresholds related to the IR sensor to change sensitivity of the IR sensor to motion occurring in the area.

In some implementations, adjusting motion detection thresholds includes adjusting characteristics of motion that are considered when motion of an object in the area results in a determination of motion occurring in the area.

BRIEF DESCRIPTION OF THE DRAWINGS

Detailed descriptions of implementations of the present technology will be described and explained through the use of the accompanying drawings.

FIG. 7 is a flow diagram illustrating an example process for adjusting motion detection thresholds of one or more sensors.

Figure 1:
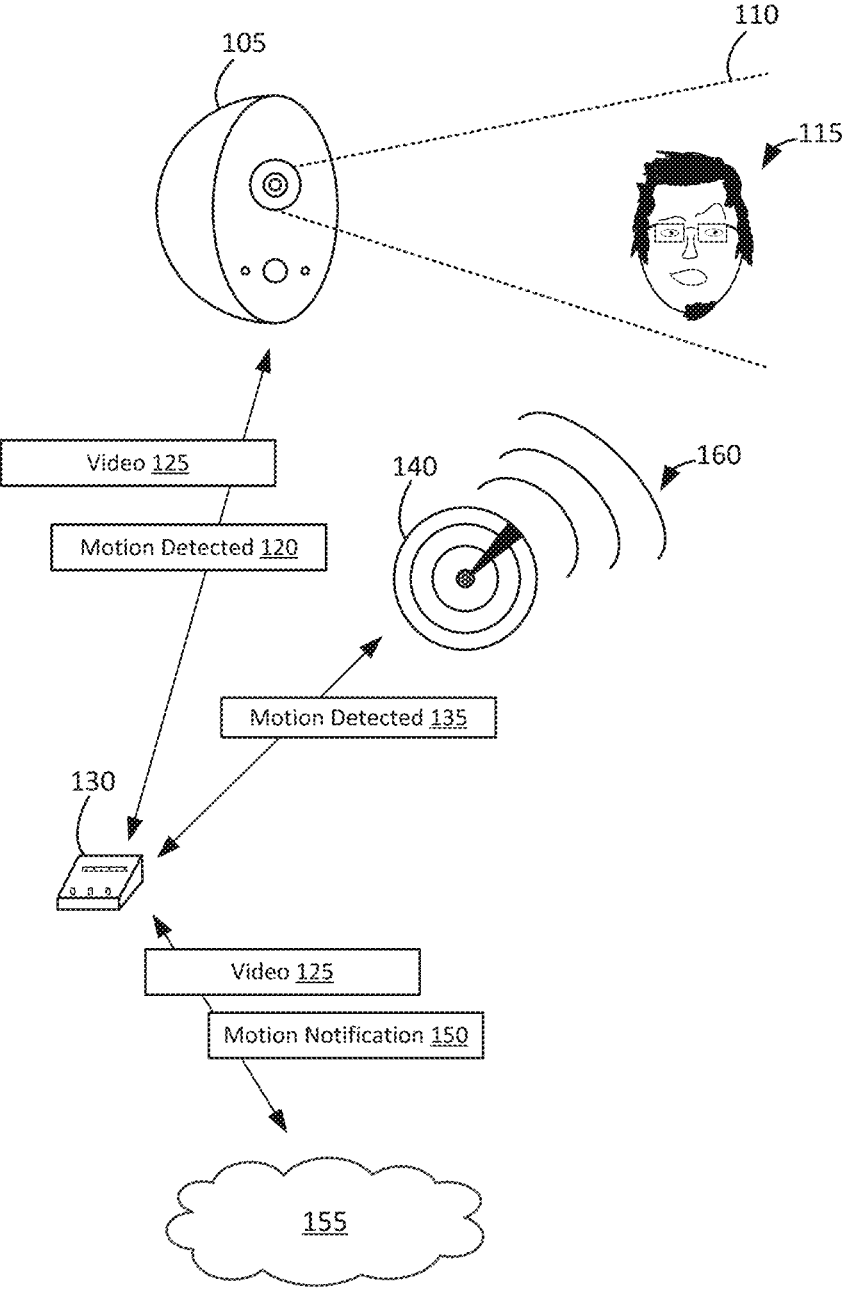
FIG. 1 illustrates an example environment for multi-sensor motion detection.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

This disclosure describes techniques for using multiple sensors for motion detection. In one example, a camera can include an IR sensor that can be used to detect motion by determining the motion of heat in the infrared portion of the electromagnetic spectrum. Upon detection of motion, the IR sensor can send a signal to a microcontroller. The microcontroller can then turn on other components of the camera, for example, a CMOS image sensor to begin recording in the visible light portion of the electromagnetic spectrum to generate a video depicting the object producing the motion as it is within the field of view of the camera. The micro-controller can also turn on a wireless device (e.g., an Institute of Electrical and Electronics Engineers (IEEE) 802.11 wireless communications semiconductor circuit) to allow for the recorded video to be uploaded to a base station and then uploaded by the base station to a cloud server for viewing by the user. The cloud server can also notify the user via a message to the user's smartphone that motion was detected in the field of vision of the camera and the video produced by the image sensor of the camera is available for viewing.

A supplemental sensor can work in conjunction (e.g., at a similar or simultaneous time) with the IR sensor of the camera to detect motion via another technique. For example, a radar sensor can be used to determine whether motion is detected in the field of vision of the camera by generating electromagnetic waves in the radio spectrum (e.g., 3 hertz (Hz) to 3 terahertz (THz)) or the microwave spectrum (e.g., 300 megahertz (MHz) to 300 gigahertz (GHz)) and detecting the reflections of those electromagnetic waves off objects. A base station can then determine whether both the IR sensor and the radar sensor detected motion in the same area. If so, then this can be a positive determination of motion detection. The base station can then provide the recorded video to a cloud server for the user to view later or provide a notification to the cloud server that motion was detected. This can allow for the user to be notified that motion was detected and the user can then decide whether to watch the video.

By using multiple and different types of sensors to detect motion, the number of false positives can be reduced. For example, if the IR sensor indicates that motion is detected but the radar sensor does not indicate that motion is detected, then this can be determined by the base station to be a false positive (i.e., there is no motion, or the motion is not important or relevant enough to alert a user). This can result in the base station not uploading the video to the cloud server, resulting in reduced bandwidth usage, reduced storage of videos at the cloud server, and reduced notifications to the user of motion detections that ended up being false positives. These can improve the user experience of the camera.

The base station can also adjust the sensitivity of the sensors to motion. For example, if the IR sensor in the above example provided a false positive, then information that it uses to detect motion can be changed. For example, a motion detection threshold can be adjusted such that the IR sensor is less sensitive to motion. Thus, characteristics of motion, such as trajectory of that motion within the field of vision (e.g., an object has to move at a higher speed to be determined to be positive determination of motion), areas within the field of vision for motion to be detected (e.g., motion should be within eight feet of the IR sensor to trigger a motion determination that is relevant to the user while motion more than eight feet away can be determined to be irrelevant), or different types of motion (e.g., objects moving in a straight line might be determined to not be relevant motion) might be considered differently by the camera and used to trigger the IR sensor to indicate that motion has been detected. However, the characteristics of motion that previously provided the false positive can no longer cause the IR sensor to determine that motion occurred in its field of vision. This can also improve the user experience as described above. Additionally, this can improve the user experience by having the motion detection be adjusted over time. This can then consider changes in the environment of the sensors, for example, new next-door neighbors, more street traffic, more vegetation growth, etc., that can be accounted for to reduce the number of false positives.

Similarly, the number of false negatives can be reduced. For example, if the IR sensor detects motion but the radar sensor does not detect motion, and the video is analyzed to determine that there was motion that is of interest to the user, then the radar sensor's sensitivity can be adjusted to be more sensitive. This can also improve the user experience.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

FIG. 1 illustrates an example environment for multi-sensor motion detection. In FIG. 1, camera 105 includes field of vision 110 in which movement can be detected, and if detected, video data can be generated to produce a video to play back what occurred within field of vision 110. For example, as previously discussed, camera 105 can include an IR sensor to determine motion and a CMOS image sensor that can be turned on to record video if the IR sensor detects motion within field of vision 110. In FIG. 1, this results in information or data such as motion detected 120 being provided to base station 130, which can provide an indication that motion was detected within field of vision 110 (e.g., the movement of intruder 115). Alternatively, or additionally, video 125 (e.g., video data including image frames depicting the movement of intruder 115 within field of vision 110) can be generated by camera 105 using the image sensor and then provided to base station 130. For example, providing video 125 to base station 130 can also be an indication that motion was detected.

Radar sensor 140 can be a supplemental sensor for detecting motion within field of vision 110 or in the general vicinity of field of vision 110 (e.g., more area than what is covered by field of vision 110) that can serve as a type of second opinion regarding whether the movement of the object within field of vision 110 is relevant or important for the user or even if it is real. For example, radar sensor 140 can generate electromagnetic waves 160 that can be reflected off objects within field of vision 110, including intruder 115. By analyzing these reflections, radar sensor 140 can determine that motion is occurring within field of vision 110. As a result, radar sensor 140 can provide information such as motion detected 135 to base station 130 to indicate that motion was detected via radar. Thus, both camera 105 and radar sensor 140 can determine whether motion is occurring within field of vision 110 within the same or similar time. As a result, when intruder 115 crosses into field of vision 110, both camera 105 and radar sensor 140 can alert base station 130 of this detected movement.

In some implementations, radar sensor 140 can be integrated within base station 130, radar sensor 140 may be a stand-alone device, radar sensor 140 can be integrated within camera 105, or all of camera 105, base station 130, and radar sensor 140 can be integrated into a single device. Radar sensor 140 can determine speed, distance from radar sensor 140, direction (e.g., approaching or retreating from radar sensor 140), or other characteristics of the position, location, or movement of objects. Radar sensor 140 can be a wide band radar, ultra-wideband (UWB) radar, continuous wave frequency modulation (CWFM) radar, or other type of radar.

Base station 130 can be communicatively coupled with camera 105 and radar sensor 140 via physical wiring or wireless technologies such as IEEE 802.11, Bluetooth, etc. Base station 130 can also be communicatively coupled with cloud server 155, for example, via an Internet connection. Base station 130 can provide notifications of detected movement within field of vision 110 (e.g., the sidewalk leading up to a home's front door) to cloud server 155, for example, via motion notification 150. Upon receiving motion notification 150, cloud server 155 can generate a message delivered to the user's (e.g., homeowner's) smartphone providing an indication that motion was detected in the area where the user set up camera 105 (e.g., within field of vision 110). This can allow the user to be informed of a possible security situation at home.

Base station 130 can also upload, or provide, video 125 to cloud server 155. As previously discussed, video 125 can be the result of the image sensor of camera 105 being used to record the activity occurring within field of vision 110 when the IR sensor of camera 105 was used to determine that motion has been detected. Video 125 can be stored by cloud server 155 and provided to the user to view, for example, via a smartphone, web browser on a computer, etc., so that the nature of the detected motion can be determined. For example, in FIG. 1, intruder 115 moving within field of vision 110 can be viewed by the user.

In FIG. 1, because both the IR sensor of camera 105 and radar sensor 140 detected motion, motion notification 150 and video 125 are provided to cloud server 155. That is, base station 130 has determined that both the IR sensor of camera 105 and radar sensor 140 have detected motion and, therefore, cloud server 155 should be notified and/or provided video 125. However, if radar sensor 140 does not detect motion, but the IR sensor of camera 105 does detect motion, then base station 130 might not provide video 125 or motion notification 150 to cloud server 155 because this can be an indication of a false positive regarding the motion that was determined by the IR sensor to be occurring. That is, there is actually no intruder moving within field of vision 110. Rather, some other activity, for example, an insect moving along the IR sensor of camera 105, might have triggered the IR sensor to provide a false positive. Other examples of scenarios in which the IR sensor might produce a false positive include temperature fluctuations, for example, by sunlight being incident upon the IR sensor.

In another example, radar sensor 140 can detect motion within field of vision 110, but the IR sensor of camera 105 might not detect motion and, therefore, video might not be recorded using the image sensor of camera 105. In this example, if radar sensor 140 (or another type of supplemental sensor) detects motion, then this can be prioritized by base station 130 and used by base station 130 to provide data to camera 105 to begin recording. Thus, video 125 can be generated and provided to cloud server 155.

Though the example in FIG. 1 uses radar sensor 140, other types of sensors can be used. For example, as discussed later, motion can be detected using a wireless mesh network implementing an IEEE 802.11 compliant wireless network.

Figures 2, 3:
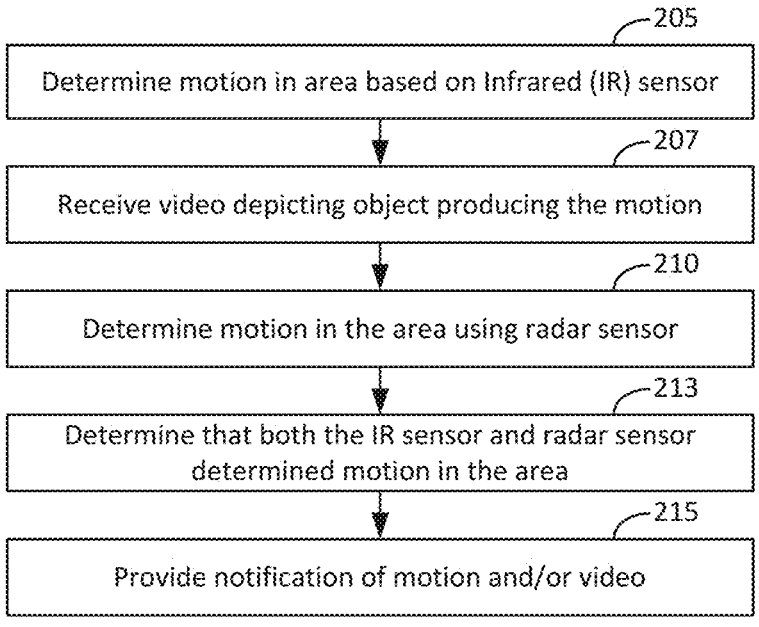
FIG. 2 is a flow diagram illustrating an example process for multi-sensor motion detecting using a radar sensor
FIG. 3 is a flow diagram illustrating an example process for multi-sensor motion detecting using wireless data.

FIG. 2 is a flow diagram illustrating an example process for multi-sensor motion detecting using a radar sensor. In some implementations, the process is performed by base station 130 illustrated and described in more detail with reference to FIG. 1. In some implementations, the process is performed by a computer system, e.g., example computer system 900 illustrated and described in more detail with reference to FIG. 9. Particular entities, for example, cloud server 155 shown by FIG. 1, perform some or all of the steps of the process in other implementations. Likewise, implementations can include different and/or additional steps or can perform the steps in different orders.

At 205, motion can be determined to be occurring within an area using an IR sensor. For example, in FIG. 1, camera 105 can include an IR sensor to detect motion occurring within field of vision 110 (e.g., the area that the IR sensor is pointing towards). The detection of the motion can be based on the IR sensor generating a voltage in response to heat detected in its field of vision. If the source of the heat moves, this results in a change in that voltage. Accordingly, this change in voltage can be used to determine that the IR sensor has detected motion. In some implementations, the IR sensor can be a passive infrared (PIR) sensor. This detection of motion can be a first indication of motion within field of vision 110. However, as previously discussed, this first indication can be a false positive or be the result of motion that is of relatively no interest to a user and, therefore, should not be used to determine that motion has occurred.

At 207, the detection of motion can be used to cause camera 105 to generate a video using an image sensor to visually depict that motion. Data regarding the motion and/or the video can then be provided to and received by base station 130.

At 210, motion can be determined to be occurring within an area using a radar sensor. This can be a second indication of motion of the same object as a double-checking or verification of the motion determined by the IR sensor of camera 105. For example, in FIG. 1, radar sensor 140 can generate electromagnetic waves 160 and determine reflections of those waves off objects within field of vision 110 and determine whether there is movement upon an analysis of those reflections. Data regarding the motion can then be provided to and received by base station 130 as a determination of motion.

At 213, a base station can determine that both the IR sensor and the radar sensor determined that motion occurred in the same or generally same area. This can be an indication that the motion of the object is not a false positive and that it is likely to be of interest for a user to be alerted to regarding the presence of the object within field of vision 110.

At 215, a notification indicating that motion was detected and/or a video of portraying the area when the motion was detected can then be provided to a cloud server such that a user can be informed of the motion. For example, in FIG. 1, video 125 and/or motion notification 150 can be provided to cloud server 155 by base station 130 if both camera 105 and radar sensor 140 provide motion detected 120 and motion detected 130, respectively, or if base station 130 provides a video. Thus, if both the IR sensor of camera 105 and radar sensor 140 detect motion within field of vision 110, video 125 can be generated by the image sensor of camera 105 and then provided to base station 130. Because radar sensor 140 also indicates that motion has occurred within field of vision 110, video 125 can then be uploaded to cloud server 155. If radar sensor 140 did not indicate that motion occurred within field of vision 110, then base station 130 might discard the video (e.g., not upload it to cloud server 155).

In some implementations, base station 130 might locally store video 125 for later viewing by the user rather than uploading to cloud server 155 if radar sensor 140 does not indicate that motion is detected. In some implementations, base station 130 might provide video 125 to cloud server 155 along with information indicating that radar sensor 140 did not detect motion (e.g., only the IR sensor of camera 105 detected motion within field of vision 110). Cloud server 155 might then store video 125 but not provide an alert to the user, as this can be a false positive. Video 125 can then be analyzed by cloud server 155 to determine why it was a false positive. In some implementations, video 125 that is related to a false positive can be stored for later viewing by the user. For example, this can represent a video of less importance or relevance to the user and, therefore, a notification might not be provided but the video would still be available for the user in case the user would like to view the video later.

Other types of supplemental sensors other than radar sensor 140 in FIG. 1 can be used to provide a second opinion or determination regarding the presence of motion within field of vision 110. For example, characteristics of a wireless network within the property in which camera 105 and base station 130 are within can be used to determine that motion has occurred. For example, Bluetooth (e.g., implementing a personal area network (PAN)) or wifi (e.g., IEEE 802.11 implementing a wireless local area network (WLAN)) devices can be used to determine that motion has occurred.

For example, radio frequency (RF) characteristics of the wireless network can be used to determine that motion has occurred. In one example, the channel state information (CSI) in wireless communications provides channel properties of a wireless communications link, for example, between base station 130 and a wireless access point. CSI can be provided by each packet as it is transmitted to or from base station 130 and an access point. The CSI can include a significant amount of information that can be analyzed by a variety of methodologies to determine that motion is occurring within the physical space that the wireless network is implemented within. For example, changes or deviations in the expected amplitude or phase of the signals as indicated in the CSI can be used to determine that motion has occurred. Thus, characteristics or changes in those characteristics of the CSI can be used to determine that motion has occurred.

FIG. 3 is a flow diagram illustrating an example process for multi-sensor motion detecting using wireless data. In some implementations, the process is performed by base station 130 illustrated and described in more detail with reference to FIG. 1. In some implementations, the process is performed by a computer system, e.g., example computer system 900 illustrated and described in more detail with reference to FIG. 9. Particular entities, for example, cloud server 155 shown by FIG. 1, perform some or all of the steps of the process in other implementations. Likewise, implementations can include different and/or additional steps or can perform the steps in different orders.

At 305, motion can be determined to have occurred in an area using an IR sensor. At 310, motion can also be determined using wireless data. For example, base station 130 can be using the same wireless network as one being provided by one or more access points. Base station 130 can receive CSI data from these other access points and based on the CSI data, base station 130 can determine that motion has occurred in the area.

At 315, a notification indicating that motion was detected and/or video depicting the motion can then be provided to a cloud server. This can occur if base station 130 determines that motion was detected by the IR sensor of camera 105 and the CSI data.

Figure 4:
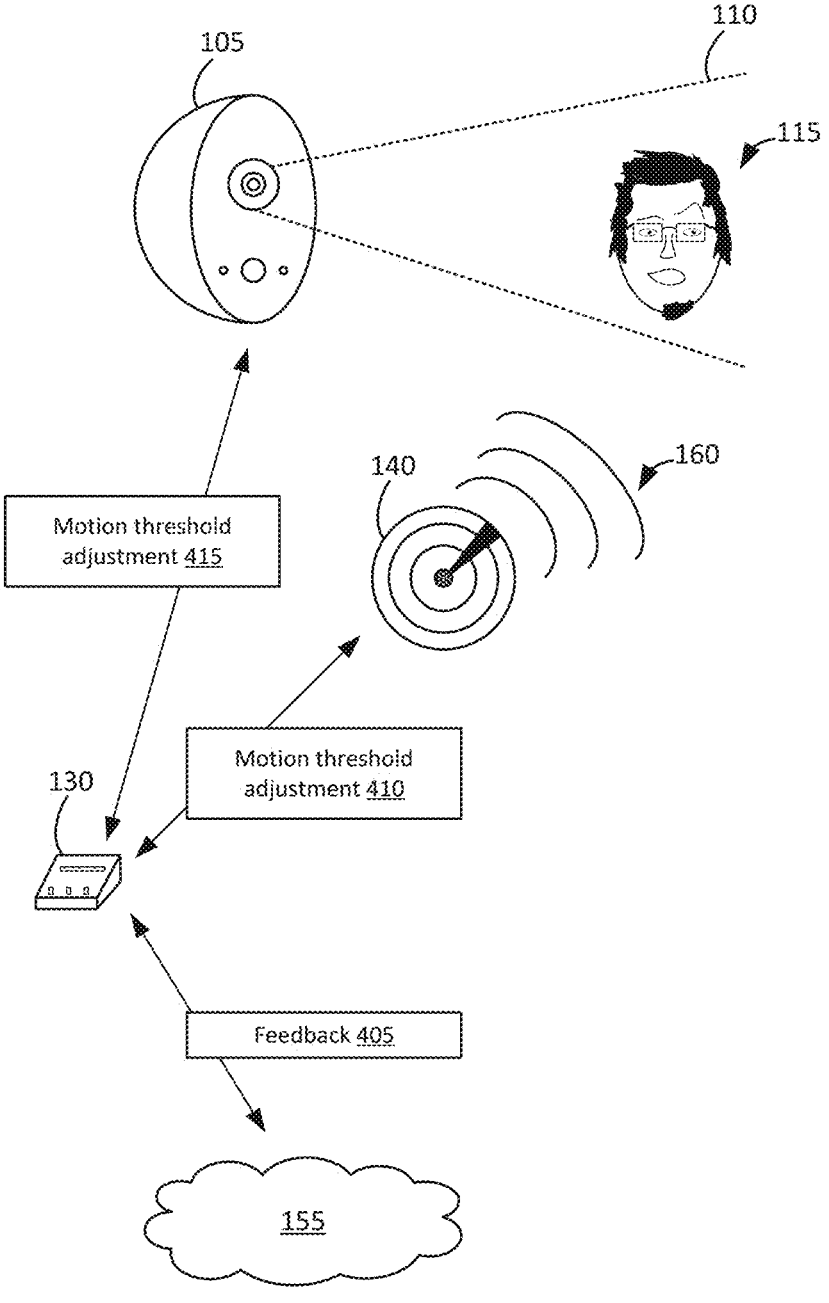
FIG. 4 illustrates an example environment for adjusting motion detection thresholds.

FIG. 4 illustrates an example environment for adjusting motion detection thresholds. A variety of machine learning or statistical analysis can also be used to adjust the sensitivity of the sensors to motion. In FIG. 4, cloud server 155 can include logic to determine whether any data or information used by camera 105 or radar sensor 140 used to detect motion should be adjusted. For example, if radar sensor 140 does not detect motion in an area that the IR sensor of camera 105 detected motion, then this discrepancy between the determinations of radar sensor 104 and camera 105 can be provided to cloud server 155. In some implementations, video 125 can also be provided. Cloud server 155 can then provide feedback 405 (e.g., based on the discrepancy, an analysis of video 125, etc.) to base station 130 which can in turn provide motion threshold adjustment 415 to camera 105. Motion threshold adjustment 415 can include information regarding changes that camera 105 should implement such that the sensitivity of its motion detection is changed. This can include changing the characteristics of the motion that are used to determine whether motion is occurring within field of vision 110. For example, if the IR sensor previously detected motion in a scenario that ended up being a false positive, then the motion determination sensitivity of camera 105 can be changed such that when the same scenario occurs, it does not indicate that meaningful motion occurred (i.e., no motion of interest to the homeowner occurred). This would result in the camera not determining that motion occurred within field of vision 110 even though before the adjustments were applied, the same type of motion would have triggered a determination that motion occurred.

In one example, this can include changing the distance from the IR sensor in which motion can be determined. Motion threshold adjustment 415 can be processed by camera 105 such that movement closer to the IR sensor would result in a motion determination while movement farther away would not result in a motion determination. In another example, the speed of motion can be adjusted such that objects would need to move faster or slower for motion to qualify as detectable motion to result in recording video or providing a notification to the user regarding the motion. In another example, the expected trajectory of the objects within field of vision 110 can be changed when camera 105 determines that motion has occurred. Thus, only some types of motion might be determined to be important or relevant to the user if the type of motion meets these motion thresholds.

Base station 130 can also provide motion threshold adjustment 410 to radar sensor 140 such that the motion thresholds for radar sensor 140 can also be changed in a similar manner.

Figure 5:
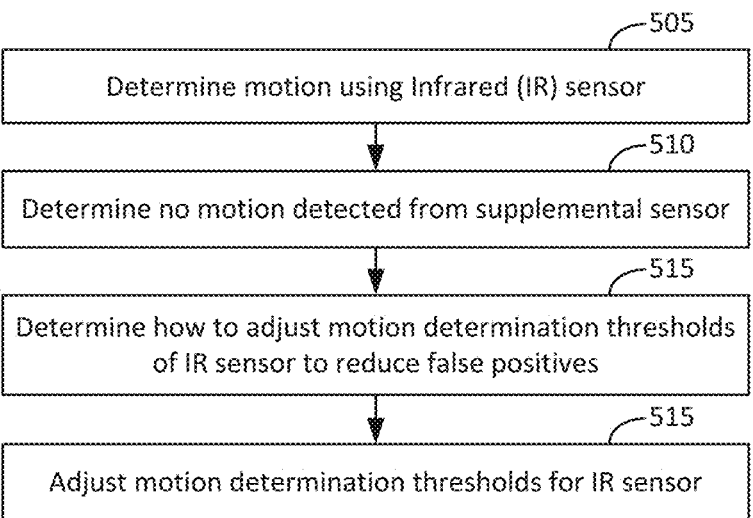
FIG. 5 is a flow diagram illustrating an example process for adjusting motion detection thresholds.

FIG. 5 is a flow diagram illustrating an example process for adjusting motion detection thresholds. In some implementations, the process is performed by base station 130 illustrated and described in more detail with reference to FIG. 1. In some implementations, the process is performed by a computer system, e.g., example computer system 900 illustrated and described in more detail with reference to FIG. 9. Particular entities, for example, cloud server 155 shown in FIG. 1, perform some or all of the steps of the process in other implementations. Likewise, implementations can include different and/or additional steps or can perform the steps in different orders.

At 505, motion can be determined to have occurred using an IR sensor. For example, motion within field of vision 110 of camera 105 in FIG. 5 might occur and that motion might have characteristics resulting in a determination that motion of interest to a user is occurring within field of vision 110. This can result in base station 130 being alerted to this motion.

At 510, no motion is detected from a supplemental sensor. For example, radar sensor 140 in FIG. 4 might not detect motion within field of vision 110. This information regarding the lack of motion can be provided to base station 130 and base station 130 can then determine that motion was determined using camera 105 but not radar sensor 140. This can be indicative of a false positive of motion detection related to camera 105.

At 515, base station 130 can determine how to adjust motion determination thresholds of the IR sensor to reduce false positives. For example, in FIG. 4, base station 130 can provide information to cloud server 155 regarding the false positive as well as the motion thresholds used by camera 105 and/or radar sensor 140 when the characteristics of motion within field of vision 110 are analyzed and determined to be motion of important or relevance to the user, as previously discussed. Any generated video data can also be provided. Cloud server 155 can analyze the received information and determine how to adjust the motion determination thresholds of the IR sensor to reduce these false positives. In another implementation, base station 130 can determine how to adjust the motion determination thresholds of the IR sensor without contacting cloud server 155. Upon determining how to adjust the motion determination thresholds, at 520, base station 130 can provide motion threshold adjustment 415 to camera 105 to update its motion thresholds such that different characteristics of motion would result in different determinations regarding movement occurring within field of vision 110 in the future. For example, camera 105 might be adjusted such that fewer determinations of motion can be determined.

Camera 105 in FIG. 1 can include radar sensor 140 integrated within it. Integrating radar sensor 140 into camera 105 can result in the same power supply (e.g., battery) used to power both the IR sensor of camera 105 and radar sensor 140. However, use of radar sensor 140 might cause the battery of camera 105 to discharge quickly due to the higher power requirements to operate radar sensor 140. The IR sensor can have lower power requirements than radar sensor 140. To preserve or extend the battery life of camera 105, radar sensor 140 can be initially turned off. When the IR sensor is triggered upon motion, this can also cause radar sensor 140 to be turned on to determine whether the motion can be verified using radar. After the determination of whether there is motion or after the operation of radar sensor 140 to allow for the determination being complete, radar sensor 140 can then be turned off. Thus, radar sensor 140 can be used only at times when it is to provide a supplemental determination of an object moving.

In some implementations, radar sensor 140 of camera 105 can be periodically turned on. For example, radar sensor 140 can be turned on for five minutes, then turned off for ten minutes, and then turned on again for five minutes, and so forth.

In some implementations, camera 105 can be optionally hardwired into a home's electrical system. Thus, camera 105 in this situation would not need to use a battery to operate radar sensor 140. Camera 105 can detect whether the power supply is a battery or the electrical system (e.g., connected with the electrical grid of an interconnected network for delivering electricity). If camera 105 is using a battery, then radar sensor 140 can be turned on and off as described above (i.e., when the IR sensor is triggered). If camera 105 is determined to be on the electrical system (i.e., not dependent on the battery), then radar sensor 140 can be turned on without the need to turn it off periodically.

The operational parameters of radar sensor 140 can also be adjusted to reduce power consumption and extend the battery life of radar sensor 140 and, therefore, extend how long radar sensor 140 can operate before needing to change or recharge the battery. For example, transmission parameters related to how electromagnetic waves 160 are generated by radar sensor 140 and propagated can be adjusted. In one example, if the amount of motion detected using the IR sensor is small (e.g., a small change in voltage produced by the IR sensor), then this small amount of motion might have a higher chance of being a false positive. In this case, radar sensor 140 can then be turned on to verify the results of the IR sensor. By contrast, if the amount of motion is large, then radar sensor 140 can remain off because a large amount of motion might have a lower chance of being a false positive. The amount of motion can be how fast the movement is, how large the object that is moving is, direction, acceleration, or other characteristics of motion as described herein. In another example, if the amount of motion is small, then the transmission parameters related to how electromagnetic waves 160 are generated can be adjusted to be different than if the amount of motion is large. For example, the frequency or frequencies used (of electromagnetic waves 160), pulse width, amplitude, pulse repetition frequency (e.g., how often or how many pulses of electromagnetic waves 160 are emitted), or other characteristics can be changed to extend battery life in certain identified situations such as the amount of motion or movement.

Figure 6:
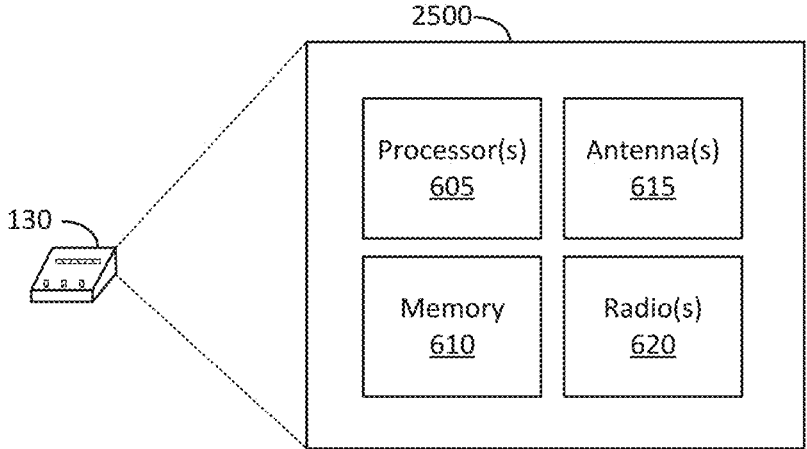
FIG. 6 illustrates an example of a simplified block diagram of an electronic device which may be used with some implementations.

FIG. 6 illustrates an example of a simplified block diagram of an electronic device which may be used with particular implementations. The electronic device of FIG. 6 can implement any of the functionalities and features discussed above, including base station 130. However, the components can also be used to implement camera 105 and radar sensor 140.

For example, FIG. 6 portrays a high-level block diagram illustrating a processing device 2500 implementing base station 130 in which at least some operations described herein can be implemented. In some implementations, the block diagram can also implement the other devices described herein, such as camera 105 and radar sensor 140. The processing system can be a system that can run any of the methods, algorithms, and/or techniques described above.

In the illustrated embodiment, the processing device 2500 includes one or more processors 605, memory 610, antennas 615, and one or more radios 620. Processors 605 may be or include, for example, one or more general-purpose programmable microprocessors or microprocessor cores, microcontrollers, application-specific integrated circuits (ASICs), programmable gate arrays, or the like, or a combination of such devices. The processor(s) 605 control the overall operation of the processing device 2500. Memory 610 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 may store data and instructions that configure the processor(s) 605 to execute operations in accordance with the techniques described above. Processing device 2500 can also include communication devices that may be or include, for example, an Ethernet adapter, cable modem, Wi-Fi adapter, cellular transceiver, Bluetooth transceiver, or the like, or a combination thereof. Depending on the specific nature and purpose of the processing device 2500, it can also include I/O devices that can include devices such as a display (which may be a touch screen display), audio speaker, keyboard, mouse or other pointing device, microphone, camera, etc. Processing device 2500 can also include radios 620, for example, a different radio for each band that communication links can be established within. Processing device 2500 can also include one or more antennas 615 for aiding the establishing of the communication links. For example, radio 620 can generate a signal that is transmitted via antenna 615.

FIG. 7 is a flow diagram illustrating an example process for adjusting motion detection thresholds of one or more sensors. In some implementations, the process is performed by the base station 130 illustrated and described in more detail with reference to FIG. 1. In some implementations, the process is performed by a computer system, e.g., the example computer system 900 illustrated and described in more detail with reference to FIG. 9. Particular entities, for example, the AI system 800, perform some or all of the steps of the process in other implementations. Likewise, implementations can include different and/or additional steps or can perform the steps in different orders.

At 704, a computer system uses a first one or more sensors to sense a presence of motion of one or more objects in an area. For example, the computer system is part of a base station or a wireless access point that includes one or more processors and a computer-readable, non-transitory memory storing instructions. The one or more processors are configured to execute the instructions such that the base station is configured to sense, using a first one or more sensors, a presence of motion of one or more objects in an area.

Example sensors are described with reference to FIGS. 1-6. For example, a camera can be used to capture images of an individual at a front entrance of a house, or an IR sensor can be caused by the computer system to detect motion by determining movement of heat patterns in the Infrared portion of the electromagnetic spectrum. In some examples, a camera can include an IR sensor that can be used to detect motion by determining the motion of heat in the infrared portion of the electromagnetic spectrum. Upon detection of motion, the IR sensor can send a signal to a microcontroller. The microcontroller can then turn on other components of the camera, for example, a CMOS image sensor to begin recording in the visible light portion of the electromagnetic spectrum to generate a video depicting the object producing the motion as it is within the field of view of the camera.

At 708, the computer system uses a second one or more sensors to sense an absence of motion in the area. The second one or more sensors can be used (e.g., at a similar or simultaneous time) as the first one or more sensors to detect motion using other techniques. For example, a radar sensor can be used to determine whether motion is detected in the field of vision of the camera by generating electromagnetic waves in the radio spectrum (e.g., 3 Hz to 3 THz) or the microwave spectrum (e.g., 300 MHz to 300 GHz) and detecting the reflections of those electromagnetic waves off objects. A base station can then determine whether both the IR sensor and the radar sensor detected motion in the same area.

At 712, the computer system generates information describing the presence of motion sensed using the first one or more sensors and the absence of motion sensed using the second one or more sensors. For example, the information can include video data depicting the motion of objects in the area as recorded by an image sensor, heat patterns in the Infrared portion of the electromagnetic spectrum, trajectory of objects within the field of vision, any of the characteristics described with reference to FIGS. 1-6, or a combination thereof. The information can indicate a speed of the one or more objects in the area, a size of the one or more objects in the area, and/or an acceleration of the one or more objects in the area. The computer system can determine, by an artificial intelligence module and based on the information, that the presence of motion sensed using the first one or more sensors is a false positive determination. Determining that the presence of motion sensed using the first one or more sensors is a false positive determination can be performed responsive to a size of the one or more objects in the area being less than a threshold size. In some examples, the artificial intelligence module performs unsupervised learning using the information describing the presence of motion sensed using the first one or more sensors and the absence of motion sensed using the second one or more sensors. Unsupervised learning is described in more detail with reference to FIG. 8.

At 716, the computer system extracts a feature vector from the information. Example feature extraction methods and example feature vectors are described in more detail with reference to FIG. 8. The feature vector can include characteristics of the first one or more sensors. For example, the feature vector can specify a type of the sensors being used by the computer system. The feature vector can indicate that the at least one of the first one or more sensors or the second one or more sensors includes an Infrared sensor, a radar sensor, and/or a camera.

The characteristics can include a focal length, a zoom setting, an aperture setting, a speed setting, or a combination thereof. The feature vector can include characteristics of the second one or more sensors, e.g., Field of view (FOV), ranging accuracy, angular resolution, point rate of a LIDAR sensor, number of beams, and/or a laser emission mode. The feature vector can describe characteristics of the one or more objects in the area. For example, object recognition is used to identify a shape, size, or color of an object. The object recognition can identify all objects in an image for use in captioning or identifying specific objects for data analysis. A computer vision model can be used to detect objects; the model can be trained to identify different objects.

The feature vector can include characteristics of the sensed presence of motion of the one or more objects in the area. If the size of a moving object detected using a sensor is small, this reading can have a higher chance of being a false positive. For example, a single moving leaf or insect can be less relevant to be detected. By contrast, if a reading of motion is large, that can have a lower chance of being a false positive. The characteristics of the sensed presence of motion can include how fast the movement is, how large the object that is moving is, direction, acceleration, or other characteristics of motion as described herein. In some examples, the characteristics of the sensed presence of motion of the one or more objects in the area include a trajectory of the one or more objects within a field of view of the first one or more sensors.

Figure 8:
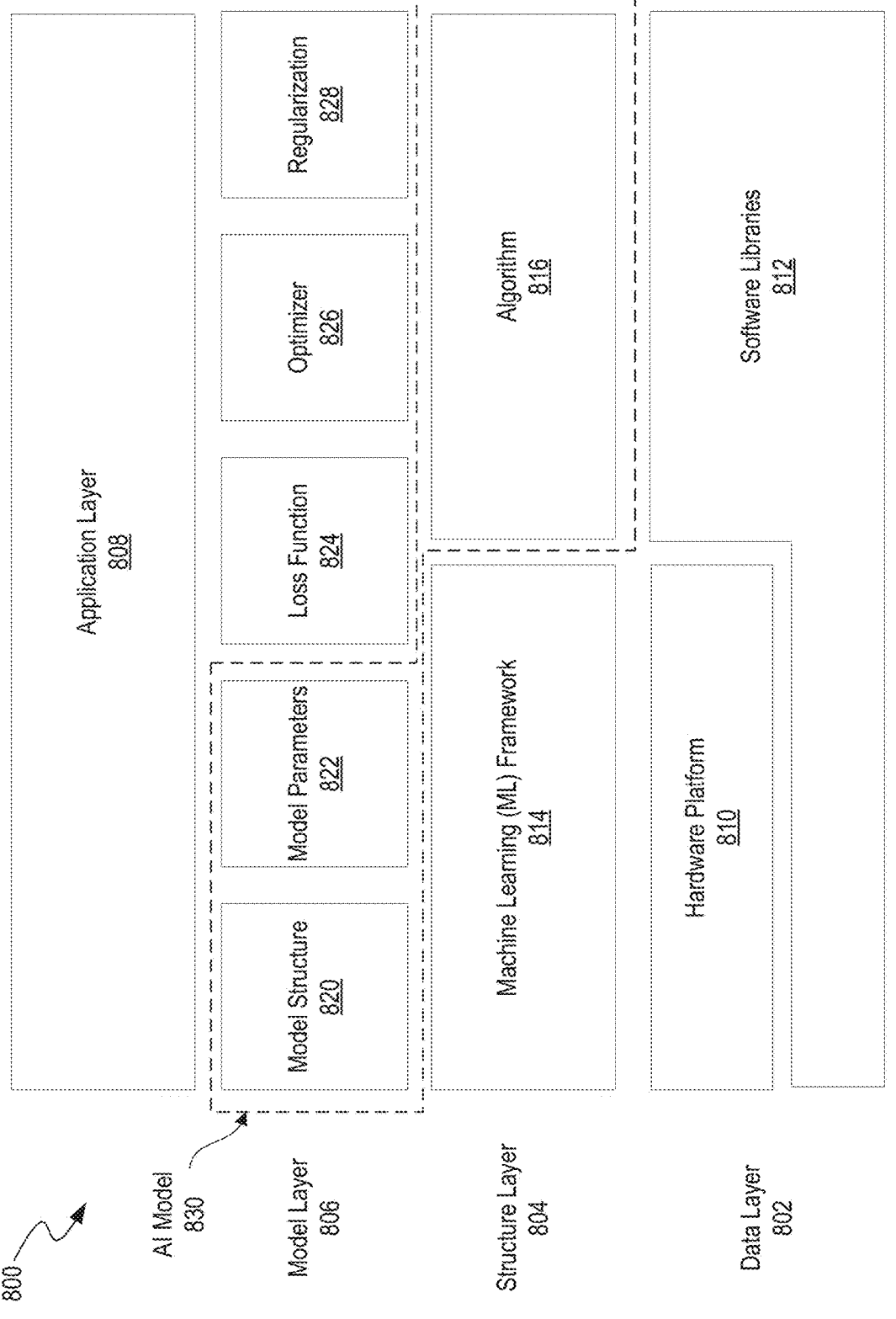
FIG. 8 is a block diagram illustrating an example artificial intelligence (AI) system.

At 720, the computer system uses an artificial intelligence module to generate an adjustment to one or more motion detection thresholds of at least one of the first one or more sensors or the second one or more sensors based on the feature vector. The artificial module can be the AI system 800 illustrated and described in more detail with reference to FIG. 8, and the AI methods described with reference to FIG. 8 are used with the feature vector. For example, the motion detection thresholds specify that the one or more objects must be within a threshold distance of the at least one of the first one or more sensors or the second one or more sensors to trigger a determination of motion. The threshold distance can be increased or reduced.

In some implementations, motion detection thresholds used by a camera are adjusted to determine motion of objects in the area. The motion detection thresholds are related to characteristics of the motion that are considered by the AI module in a determination that motion is occurring in the area. For example, for an Infrared (IR) sensor, motion detection thresholds related to the IR sensor are adjusted to change sensitivity of the IR sensor to motion occurring in the area. In some examples, adjusting motion detection thresholds includes adjusting characteristics of motion that are considered when motion of an object in the area results in a determination of motion occurring in the area.

In some implementations, the computer system uses the artificial intelligence module to determine that the presence of motion sensed using the first one or more sensors is a false positive determination. In response to determining that the presence of motion is a false positive determination, the computer system refrains from sending a notification of the presence of motion to a user device.

Generating the adjustment is performed responsive to determining that the presence of motion is a false positive determination. For example, if an IR sensor provided a false positive, then a motion detection threshold can be adjusted such that the IR sensor is less sensitive to motion. Thus, characteristics of motion, such as trajectory of that motion within the field of vision (e.g., an object has to move at a higher speed to be determined to be positive determination of motion), areas within the field of vision for motion to be detected (e.g., motion should be within eight feet of the IR sensor to trigger a motion determination that is relevant to the user while motion more than eight feet away can be determined to be irrelevant), or different types of motion (e.g., objects moving in a straight line might be determined to not be relevant motion) can be considered differently and used to trigger the IR sensor to indicate that motion has been detected.

In some examples, an adjustment to the motion detection thresholds prevent a determination of motion when the one or more objects are moving in a straight line. The sensors can also consider changes in the environment of the sensors, for example, new next-door neighbors, more street traffic, more vegetation growth, etc., that can be accounted for to reduce the number of false positives.

In some implementations, the computer system uses the artificial intelligence module to determine that the absence of motion sensed using the second one or more sensors is a false negative determination. Generating the adjustment is performed responsive to determining that the absence of motion is a false negative determination. For example, the sensitivity (which determines how easily a sensor detects motion) can be changed. A lower sensitivity means the sensor is less likely to detect motion. A higher sensitivity means the sensor is more likely to detect motion. The motion detection thresholds (which determine at what point the motion detection feature is triggered) can also be changed. A lower threshold means less motion is needed to trigger the motion detection feature. A higher threshold means more motion is needed to trigger the motion detection feature.

At 724, the computer system generates and sends information to the at least one of the first one or more sensors or the second one or more sensors. The information describes the adjustment to the motion detection thresholds for the at least one of the first one or more sensors or the second one or more sensors to be configured using the adjustment. For example, the information can indicate that the frequency, pulse width, amplitude, pulse repetition frequency, or other characteristics should be changed and by how much.

FIG. 8 is a block diagram illustrating an example artificial intelligence (AI) system 800, in accordance with one or more embodiments of this disclosure. The AI system 800 is implemented using components of the example computer system 900 illustrated and described in more detail with reference to FIG. 9. For example, the AI system 800 can be implemented using the processor 902 and instructions 908 programmed in the memory 906 illustrated and described in more detail with reference to FIG. 9. Likewise, implementations of the AI system 800 can include different and/or additional components or be connected in different ways.

As shown, the AI system 800 can include a set of layers, which conceptually organize elements within an example network topology for the AI system's architecture to implement a particular AI model 830. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form the example AI model 830. The optimizer 826, loss function engine 824, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and include computing resources for storage, memory, logic, and networking, such as the resources described in relation to FIG. 9. The hardware platform 810 can process amounts of data using one or more servers. The servers can perform backend operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources (e.g., servers, memory, etc.) offered by a cloud services provider. The hardware platform 810 can also include computer memory for storing data about the AI model 830, application of the AI model 830, and training data for the AI model 830. The computer memory can be a form of random access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include Intel Math Kernel Library, Nvidia cuDNN, Eigen, and Open BLAS.

The structure layer 804 can include an ML framework 814 and an algorithm 816. The ML framework 814 can be thought of as an interface, library, or tool that allows users to build and deploy the AI model 830. The ML framework 814 can include an open-source library, an application programming interface (API), a gradient-boosting library, an ensemble method, and/or a deep learning toolkit that work with the layers of the AI system facilitating development of the AI model 830. For example, the ML framework 814 can distribute processes for application or training of the AI model 830 across multiple resources in the hardware platform 810. The ML framework 814 can also include a set of pre-built components that have the functionality to implement and train the AI model 830 and allow users to use pre-built functions and classes to construct and train the AI model 830. Thus, the ML framework 814 can be used to facilitate data engineering, development, hyperparameter tuning, testing, and training for the AI model 830.

Examples of ML frameworks 814 or libraries that can be used in the AI system 800 include TensorFlow, PyTorch, Scikit-Learn, Keras, and Cafffe. Random Forest is a machine learning algorithm that can be used within the ML frameworks 814. LightGBM is a gradient-boosting framework/ algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some embodiments, the ML framework 814 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 800. For example, the ML framework 814 can use a cascade of multiple layers of nonlinear processing units for implicit feature extraction and transformation. Each successive layer uses the output from the previous layer as input. The AI model 830 can thus learn in supervised (e.g., classification) and/or unsupervised (e.g., pattern analysis) modes. The AI model 830 can learn multiple levels of representations that correspond to different levels of abstraction, wherein the different levels form a hierarchy of concepts. In this manner, AI model 830 can be configured to differentiate features of interest from background features.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make predictions or decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include data received from user equipment. The user may label the training data based on one or more classes and trains the AI model 830 by inputting the training data to the algorithm 816. The algorithm determines how to label the new data based on the labeled training data. The user can facilitate collection, labeling, and/or input via the ML framework 814. In some instances, the user may convert the training data to a set of feature vectors for input to the algorithm 816. Once trained, the user can test the algorithm 816 on new data to determine if the algorithm 816 is predicting accurate labels for the new data. For example, the user can use cross-validation methods to test the accuracy of the algorithm 816 and retrain the algorithm 816 on new training data if the results of the cross-validation are below an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., classes) and determines how features observed in the training data (e.g., RAN resources) relate to the categories (e.g., services and applications). Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the label's output when the algorithm 816 is trained using supervised learning. Another way unsupervised learning is used to train the algorithm 816 to find an underlying structure of a set of data is to group the data according to similarities and represent that set of data in a compressed format. The XR system 700 disclosed herein can use unsupervised learning to identify patterns in data received from the network (e.g., to identify features for different XR environments) and so forth. In some implementations, performance of the XR system 700 using unsupervised learning is improved by improving the video provided to the computer system of the XR device, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques include density-based methods, hierarchical based methods, partitioning methods, and grid-based methods. In one example, the algorithm 816 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 816 include factor analysis, item response theory, latent profile analysis, and latent class analysis.

In some embodiments, the AI system 800 trains the algorithm 816 of AI model 830, based on the training data, to correlate the feature vector to expected outputs in the training data. As part of the training of the AI model 830, the AI system 800 forms a training set of features and training labels by identifying a positive training set of features that have been determined to have a desired property in question, and, in some embodiments, forms a negative training set of features that lack the property in question. The AI system 800 applies ML framework 814 to train the AI model 830, so that when applied to the feature vector, it outputs indications of whether the feature vector has an associated desired property or properties, such as a probability that the feature vector has a particular Boolean property or an estimated value of a scalar property. The AI system 800 can further apply dimensionality reduction (e.g., via linear discriminant analysis (LDA), principal component analysis, or the like) to reduce the amount of data in the feature vector to a smaller, more representative set of data.

The model layer 806 implements the AI model 830 using data from the data layer and the algorithm 816 and ML framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how the node converts data received to data output. The structure layers may include an input layer of nodes that receive input data and an output layer of nodes that produce output data. The model structure 820 may include one or more hidden layers of nodes between the input and output layers. The model structure 820 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural networks, such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the AI model's 830 performance during training. For instance, the loss function engine 824 can measure the difference between a predicted output of the AI model 830 and the actual output of the AI model 830 and is used to guide optimization of the AI model 830 during training to minimize the loss function. The loss function may be presented via the ML framework 814, such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model 830. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 826 used may be determined based on the type of model structure 820 and the size of data and the computing resources available in the data layer 802.

The regularization engine 828 executes regularization operations. Regularization is a technique that prevents over- and underfitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The regularization engine 828 can apply one or more regularization techniques to fit the algorithm 816 to the training data properly, which helps constraint the resulting AI model 830 and improves its ability for generalized application. Examples of regularization techniques include lasso (L1) regularization, ridge (L2) regularization, and elastic (L1 and L2 regularization).

In some embodiments, the AI system 800 can include a feature extraction module implemented using components of the example computer system 900 illustrated and described in more detail with reference to FIG. 9. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 830 by using this reduced representation. In some example embodiments, the following dimensionality reduction techniques are used by the feature extraction module: independent component analysis, Isomap, principal component analysis (PCA), latent semantic analysis, partial least squares, multifactor dimensionality reduction, nonlinear dimensionality reduction, multilinear PCA, multilinear subspace learning, semidefinite embedding, autoencoder, and deep feature synthesis.

The application layer 808 describes how the AI system 800 is used to solve problems or perform tasks. In an example implementation, the application layer 808 can include the XR application of the XR system 700 illustrated and described in more detail with reference to FIG. 7. Referring still to the example implementation, the XR system 700 can include an AI platform with a plurality of environment-type-specific AI modules. The environment-type-specific AI modules can include the AI system 800 and can be applied to the image/video data of the environment to provide environmental mapping. The environment-type-specific AI modules can be trained using environment-type grouped data sets, including environment-type mappings. Environment-type mappings can include layers based on the environment type. For example, a mall mapping can include layers showing features such as people, baggage, and vehicles. A home mapping can include layers showing landscaping, patios, walls, etc. The user can select layers, data sets, and mapping information to be added or removed from the environment-type data. The use of the AI system 800 in the XR system 700 is described in more detail with reference to FIG. 7.

Figure 9:
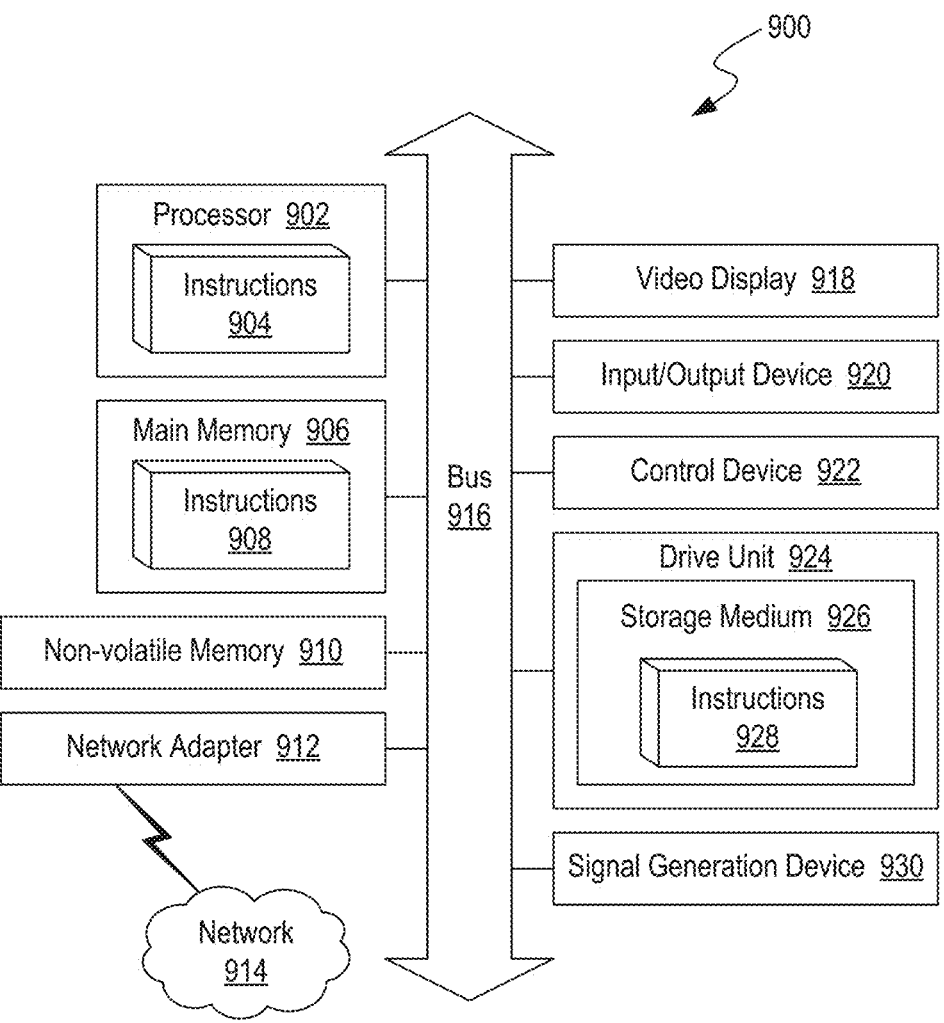
FIG. 9 is a block diagram illustrating an example computer system.

FIG. 9 is a block diagram that illustrates an example of a computer system 900 in which at least some operations described herein can be implemented. As shown, the com-
puter system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementation, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

REMARKS

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with the processing devices described herein can be implemented as circuitry, firmware, software, other executable instructions, or any combination thereof. For example, the functional components can be implemented in the form of special-purpose circuitry, in the form of one or more appropriately programmed processors, a single-board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channels) to coordinate their operations. Some or all of the functional components may be combined as one component. A single functional component may be divided into sub-components, each sub-component performing a separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications can be made without deviating from the scope of the invention. Accordingly, the invention is not limited except as by the appended claims.

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method comprising:
sensing, using a first one or more sensors, a presence of motion of one or more objects in an area;
sensing, using a second one or more sensors, an absence of motion in the area;
generating, using one or more computer processors, first information describing the presence of motion sensed using the first one or more sensors and the absence of motion sensed using the second one or more sensors;
extracting, from the first information, a feature vector describing:
characteristics of the first one or more sensors,
characteristics of the second one or more sensors, and/or
characteristics of the sensed presence of motion of the one or more objects in the area;
generating, using an artificial intelligence module, an adjustment to one or more motion detection thresholds of at least one of the first one or more sensors or the second one or more sensors based on the feature vector; and
sending, to the at least one of the first one or more sensors or the second one or more sensors, second information describing the adjustment to the motion detection thresholds for the at least one of the first one or more sensors or the second one or more sensors to be configured using the adjustment.

2. The method of claim 1, comprising:
determining, by the artificial intelligence module, that the presence of motion sensed using the first one or more sensors is a false positive determination,
wherein generating the adjustment is performed responsive to determining that the presence of motion is a false positive determination.

3. The method of claim 1, comprising:
determining, by the artificial intelligence module, that the absence of motion sensed using the second one or more sensors is a false negative determination, wherein generating the adjustment is performed responsive to determining that the absence of motion is a false negative determination.

4. The method of claim 1, wherein the feature vector indicates that the at least one of the first one or more sensors or the second one or more sensors includes an Infrared sensor, a radar sensor, and/or a camera.

5. The method of claim 1, wherein the characteristics of the sensed presence of motion of the one or more objects in the area include a trajectory of the one or more objects within a field of view of the first one or more sensors.

6. The method of claim 1, wherein the motion detection thresholds specify that the one or more objects must be within a threshold distance of the at least one of the first one or more sensors or the second one or more sensors to trigger a determination of motion.

7. The method of claim 1, wherein the motion detection thresholds prevent a determination of motion when the one or more objects are moving in a straight line.

8. A base station, comprising:

one or more processors; and a computer-readable, non-transitory memory storing instructions, wherein the one or more processors are configured to execute the instructions such that the base station is configured to:

sense, using a first one or more sensors, a presence of motion of one or more objects in an area;

sense, using a second one or more sensors, an absence of motion in the area;

generate, using one or more computer processors, first information describing the presence of motion sensed using the first one or more sensors and the absence of motion sensed using the second one or more sensors;

extract, from the first information, a feature vector describing characteristics of the one or more objects in the area;

generate, using an artificial intelligence module, an adjustment to one or more motion detection thresholds of at least one of the first one or more sensors or the second one or more sensors based on the feature vector; and send, to the at least one of the first one or more sensors or the second one or more sensors, second information describing the adjustment to the motion detection thresholds for the at least one of the first one or more sensors or the second one or more sensors to be configured using the adjustment.

9. The base station of claim 8, wherein the base station is configured to:

determine, by the artificial intelligence module, that the presence of motion sensed using the first one or more sensors is a false positive determination, wherein generating the adjustment is performed responsive to determining that the presence of motion is a false positive determination.

10. The base station of claim 9, wherein the base station is configured to:

responsive to determining that the presence of motion is a false positive determination, refrain from sending a notification of the presence of motion to a user device.

11. The base station of claim 8, wherein the base station is configured to:

determine, by the artificial intelligence module, that the absence of motion sensed using the second one or more sensors is a false negative determination, wherein generating the adjustment is performed responsive to determining that the absence of motion is a false negative determination.

12. The base station of claim 8, wherein the feature vector describes characteristics of the first one or more sensors, characteristics of the second one or more sensors, and/or characteristics of the sensed presence of motion of the one or more objects in the area.

13. The base station of claim 8, wherein the feature vector indicates that the at least one of the first one or more sensors or the second one or more sensors includes an Infrared sensor, a radar sensor, and/or a camera.

14. The base station of claim 8, wherein the feature vector indicates a trajectory of the one or more objects within a field of view of the first one or more sensors.

15. A wireless access point, comprising:

one or more processors; and a computer-readable, non-transitory memory storing instructions, wherein the one or more processors are configured to execute the instructions to cause the access point to:

sense, using a first one or more sensors, a presence of motion of one or more objects in an area;

sense, using a second one or more sensors, an absence of motion in the area;

generate, using one or more computer processors, information describing the presence of motion sensed using the first one or more sensors and the absence of motion sensed using the second one or more sensors;

determine, by an artificial intelligence module and based on the information, that the presence of motion sensed using the first one or more sensors is a false positive determination;

generate, using the artificial intelligence module, an adjustment to one or more motion detection thresholds of the first one or more sensors; and cause the first one or more sensors to be configured using the adjustment to the motion detection thresholds.

16. The access point of claim 15, wherein the information indicates a speed of the one or more objects in the area, a size of the one or more objects in the area, and/or an acceleration of the one or more objects in the area.

17. The access point of claim 15, wherein determining that the presence of motion sensed using the first one or more sensors is a false positive determination is performed responsive to a size of the one or more objects in the area being less than a threshold size.

18. The access point of claim 15, wherein the artificial intelligence module performs unsupervised learning using the information describing the presence of motion sensed using the first one or more sensors and the absence of motion sensed using the second one or more sensors.

19. The access point of claim 15, wherein the instructions cause the access point to extract, from the information, a feature vector describing:

characteristics of the first one or more sensors, characteristics of the second one or more sensors, and/or characteristics of the sensed presence of motion of the one or more objects in the area.

20. The access point of claim 15, wherein the information indicates that the at least one of the first one or more sensors or the second one or more sensors includes an Infrared sensor, a radar sensor, and/or a camera.

* * * * *